United States Patent [19]

Yoshida

[11] 3,968,420

[45] July 6, 1976

[54] CHOPPER CIRCUIT ARRANGEMENT

[75] Inventor: Susumu Yoshida, Tokyo, Japan

[73] Assignee: Kabushiki Kaisha Meidensha, Tokyo, Japan

[22] Filed: Oct. 4, 1974

[21] Appl. No.: 512,323

[52] U.S. Cl. ............................ 321/45 C; 307/252 M
[51] Int. Cl.² ................................................. H02M 7/515
[58] Field of Search ......... 307/252 M; 321/43, 45 C

[56] References Cited
UNITED STATES PATENTS

| | | | |
|---|---|---|---|
| 3,365,640 | 1/1968 | Gurwicz | 307/252 M X |
| 3,555,399 | 1/1971 | Buchanan et al. | 321/43 |
| 3,845,379 | 10/1974 | Kawamata et al. | 321/45 C |

Primary Examiner—William M. Shoop
Attorney, Agent, or Firm—Haseltine, Lake & Waters

[57] ABSTRACT

In a circuit arrangement such as a chopper circuit of the type that controls a voltage to be applied to a load, a first switching element, a series and resonating circuit consisting of an inductance element and a capacitor connected in parallel to said first switching element, and a second switching element for short-circuiting said inductance element. The second switching element is connected in forward direction with respect to said first switching element and in parallel to said inductance element. Each of said elements comprises a thyristor.

10 Claims, 13 Drawing Figures

CHOPPER CIRCUIT ARRANGEMENT

FIELD OF THE INVENTION

The present invention relates to a chopper circuit arrangement, and more particularly relates to a chopper circuit of the type that controls a direct-current voltage which is applied to a load.

BACKGROUND OF THE INVENTION

In recent years, the chopper circuit has been widely employed in the various kinds of control arrangements in order to control the DC voltage to be applied to a load. A chopper circuit normally includes switching elements for controlling the current to be supplied to the load, and the other elements such as external commutation means for turning on and off the switching elements. It is particularly advantageous to be able to reduce the number of switching elements and to enhance the performance of the circuit. Particularly, in a chopper circuit employing a thyristor as the switching element, when the forward current whose value $i_o$ flows into the thyristor, it is necessary to render the resultant current flowing through the thyristor zero by supplying a reverse-current whose value is at least $i_o$, in order to turn off the thyristor. As the thyristor, however, is not always turned off by rendering the resultant current zero, a commutation capacity for obtaining a reverse-current value of more than $i_o$ is required in the chopper circuit.

Conventional and prior art chopper arrangements are shown in FIGS. 1 and 2. Referring particularly to FIG. 1, a chopper circuit CH comprise a main thyristor 10, a first auxiliary thyristor 12 connected in parallel through a commutation capacitor 14 to the main thyristor 10 and a second auxiliary thyristor 16 (which may be replaced by a suitable semiconductor such as a diode) connected in series across a commutation reactor 18 to the thyristor 12. The chopper circuit CH is connected to a direct current power source such as a battery 20 in series relationship through a electric motor 22. The motor 22 consists of an armature winding 24, a field winding 26 and a free-wheeling diode 28 which is connected in parallel with a series circuit consisting of the armature winding 24 and the field winding 26.

In the arrangement of FIG. 1, the chopper circuit CH can control a relatively great load current. In the circuit, however, it is necessary to provide three switching elements, that is, the main thyristor 10, the first auxiliary thyristor 12 and the second auxiliary thyristor 16, as is shown in FIG. 1, and accordingly the arrangement is complicated and expensive.

FIG. 2 shows a known chopper circuit which consists of a switching element such as, for example, a main thyristor 10, a series circuit consisting of a reactor 18 and a capacitor 14, and a series connected diode 30 which can be omitted. In the circuit of FIG. 2, the only one thyristor is employed and, therefore, the cost of the circuit is lowered in comparison with the chopper circuit of FIG. 1.

The waveforms shown in FIG. 3 are illustrative of the mode of operation of the FIG. 2 circuit. In operation, when the thyristor 10 in FIG. 2 is turned on as occurs at time $t=t_o$, the initial load current $I_B$ whose value is $i_o$ flows into the thyristor 10. The load current value $i_o$ is assumed to be constant as a matter of convenience, when the thyristor 10 is in one state. On the other hand, the currents $I_C$ ($I_{C1}$ and $I_{C2}$) designated in FIG. 2 as flowing through the capacitor 14 try to flow symmetrically in both directions, because its polarity is inverted at time $t=t_1$ as shown by the waveform $I_c$ of FIG. 3. Accordingly, the current $I_S$ flowing through the thyristor 10 is the resultant current ($I_C + I_B$) which is the sum of the capacitor current $I_C$ and the current $I_B$ flowing through the load, as shown the curve $I_s$.

In this case, if the peak value $i_{cp}$ of the current $I_C$ is smaller than the value $i_o$, the thyristor current $I_S$ would not become zero even if the reverse current $I_{C2}$ with respect to the current $I_{C1}$ tries to cancel the load current $I_B$, and therefore the thyristor 10 will never be turned off. Accordingly, to turn off the main thyristor 10, it is necessary that the peak value $i_{cp}$ of the capacitor current $I_C$ be greater than the value $i_o$ of the load current $I_B$. However, when the current $I_S$ flowing through the main thyristor 10 becomes zero at the time $t_3$ illustrated in FIG. 3, the capacitor current $I_C$ is superimposed on the load current $I_B$ when the main thyristor 10 is in ON state, and, as a result, the peak value of the thyristor current $I_S$ becomes greater than twice the value $i_o$. Therefore, since the rated capacity of the thyristor 10 is required to be greater than the twice of the load current value, the switching element itself becomes costly.

In like manner, as the only one thyristor is used in the chopper circuit of FIG. 2, the number of circuit elements may be few and the treatment of low current can be performed economically. However, in case of treating a greater current, the circuit of FIG. 2 lacks the commutation capability, and is expensive because a greater capacity and high price capacitor must be used in order to compensate the shortage of commutation capacity.

Further prior art circuit arrangements are disclosed in U.S. Pat. No. 3,365,640 and U.S. Pat. No. 3,555,399 wherein each of the circuit arrangements, respectively, includes a first switching element, a series circuit connected in parallel to said first switching element, and consisting of an inductance element, a capacitance element and a diode for preventing the reverse current, and a second switching element connected in parallel to said diode and said inductance or capacitance element.

The circuit arrangements described above are basically and substantially different from the circuit arrangement of the present invention.

SUMMARY OF THE INVENTION

It is a primary object of the present invention is to provide a chopper circuit arrangement which overcomes the above drawbacks, namely, a circuit arrangement in which high performance is obtained and the cost is lowered.

More specifically, an object of the present invention is to provide an economical and high performance chopper circuit which allows for a reduction in the number of switching elements and is able to control large magnitude currents by means of utilizing a capacitor whose capacity is small for a given current value.

With the above object in view, the present invention resides mainly in a circuit arrangement which comprises a main thyristor, a series circuit consisting of an inductance and a capacitor which is connected parallel between an anode electrode and a cathode electrode of the main thyristor, and an auxiliary thyristor for short-circuiting the inductance which is connected in forward direction with respect to the main thyristor and in parallel to the inductance.

BRIEF DESCRIPTION OF THE DRAWING

Other objects, features and attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION

Figure 4:
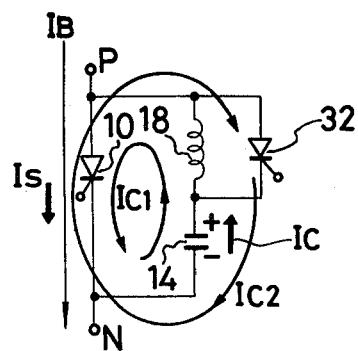
FIG. 4 is a detailed circuit diagram of a new and improved chopper circuit of the present invention.

Referring now once again to the drawings, FIG. 4 shows a circuit in accordance with one embodiment of the present invention. Component 10 is a main thyristor and one terminal of an inductance such as a commutation reactor 18 is connected to an anode electrode terminal of the thyristor 10. A capacitor 14 is connected between the other terminal of the reactor 18 and a cathode electrode of the thyristor 10. Further, an auxiliary thyristor 32 is connected in parallel relationship to the reactor 18 in forward relation with respect to the thyristor 10.

Figure 5:
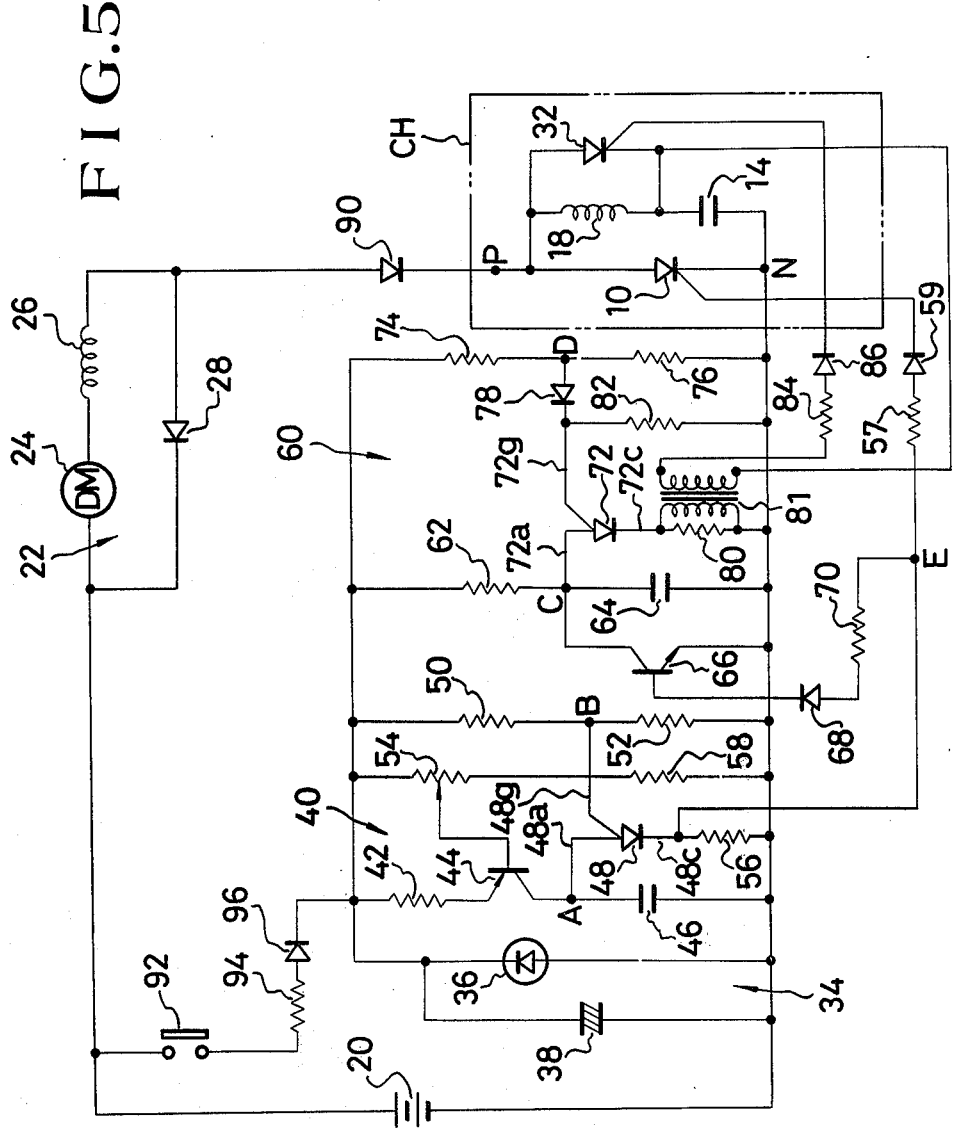
FIG. 5 is a detailed circuit of the chopper arrangement in accordance with the present invention, which is provided with a chopper control circuit.

The detailed operation may be described by means of the circuit arrangement of FIG. 5. Namely, the chopper arrangement providing the oscillating control circuit is shown in FIG. 5. In the circuit arrangement, the chopper circuit CH is connected serially to the battery 20 across the motor 22 and a diode 90. The reference numeral 34 denotes a constantvoltage power circuit which comprises a Zener diode 36 and a capacitor 38 connected in parallel with the Zener diode 36. An ON-pulse oscillator 40 comprises a resistor 42, a transistor 44 whose emitter electrode is connected to the resistor 42, a capacitor 46 whose one terminal is connected to the collector electrode of the transistor 44, a programmable unijunction transistor (hereinafter called PUT) 48 whose anode electrode is connected to a junction point A located between the collector electrode of the transistor 44 and the capacitor 46 and further whose gate electrode is connected to a junction B between resistors 50 and 52, and a variable resistor 54 whose tap is connected to a base electrode of the transistor 44. Further, a cathode electrode of the PUT 48 is connected to a gate electrode of the main thyristor 10 of the chopper circuit CH via a resistor 57 and a diode 59. An Off-pulse oscillator 60 comprises a timing circuit which consists of a serially connected resistor 62 and capacitor 64, a PUT 72 whose anode is connected to a junction point C between the resistor 62 and the capacitor 64, resistors 74 and 76, and a diode 78 for compensating temperature which is connected between a junction point D of resistors 74 and 76 and a gate electrode of the PUT 72. Further, a cathode electrode of the PUT 72 is connected to a gate electrode of the auxiliary thyristor 32 across a pulse-transformer 81, a resistor 84 and a diode 86. A synchronizing circuit is provided which consists of a transistor 66 connected in parallel to the capacitor 64 by its collector and emitter electrodes, a diode 68 serially connected to a base of the transistor 66, and a resistor 70 serially connected between the diode 68 and a junction E located between the cathode electrode 48C of the PUT 48 and the gate electrode of the main thyristor 10.

To initiate a cycle of operation, when the switch 92 is closed, the current from the battery 20 is supplied to the constant-voltage power circuit 34 through a resistor 94 and a diode 96 and, therefore, the constant-voltage is generated in the constant voltage power circuit 34. And the ON and OFF pulse oscillators are used in order to control the conduction ratio of the chopper circuit CH, and, thereby, the average voltage to be applied to the load motor 22 is controlled. More specifically, if the resistance value of the variable resistor 54 is set at a suitable value, the conduction value will change in response to the setting value of the variable resistor 54, and, as a result, the charging time of the capacitor 46 will vary. Specifically, the electric charge is accumulated by the capacitor 46 in a time decided by the resistance value of the resistor 42, the conduction value of the transistor 44 and the capacitance value of the capacitor 46. When the voltage of the capacitor 46 attains the preselected voltage decided by the resistors 50 and 52, the PUT 48 will be conductive state and the electric charge of the capacitor 46 will discharge through the cathode electrode 48C of the PUT 48. The discharge current from the capacitor 46 is supplied to the main thyristor 10 as the gating current through the resistor 57 and the diode 59, and also is supplied to the base of the transistor 66 through the resistor 70 and the diode 68, whereby the main thyristor 10 and the transistor 66 are turned ON together. At this time, the OFF-pulse oscillator 60 does not become activated, since the capacitor 46 is short-circuited by the transistor 66.

Next, when the capacitor 46 of the ON-pulse oscillator 40 finishes discharging, the transistor 66 will be turned OFF since no more discharging current is supplied thereto. If the transistor 66 switches off, the charging of the capacitor 64 will be initiated and will proceed at a rate decided by the resistance value of the resistor 62 and the capacitance value of the capacitor 64. When the charging voltage of the capacitor 64 attains the potential preselected by the resistors 74 and 76, the PUT 72 will become conductive state and the electric charge on the capacitor 64 will be discharged through the pulse-transformer 81, the resistor 84 and the diode 86 to the auxiliary thyristor 32 as the firing current, and, thereby, the auxiliary thyristor 32 will be caused to assume the conductive state by means of the discharging current from the capacitor 64.

Figure 6A:
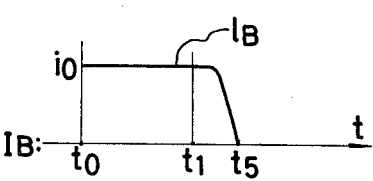
FIGS. 6A through 6C are respectively curves depicting illustrating current derived from the circuit of FIG. 4.

In the above described mode of operation, when the main thyristor 10 is in non-conductive state, the commutation capacitor 14 has charged up according to the polarity shown in FIG. 4. If the main thyristor 10 turns ON at the time $t=t_o$ designated in FIGS. 6A and 6B, the resultant current by means of the load current $I_B$ and the current $I_C$ ($I_{C1}$ or $I_{C2}$) flows through the main thyristor 10. Accordingly, the resultant current and/or the thyristor current $I_s$ is supplied to the main thyristor 10, as illustrated by the oblique lines in FIG. 6C.

In this case, the polarity of the current $I_C$ flowing through the capacitor 14, due to the resonance of the reactor 18 and the capacitor 14, is inverted after an given time interval $t=t_c$ ($=\pi \sqrt{Co\, Lo}$) decided by the capacitance value Co of the capacitor 14 and the reactance value Lo of the reactor 18. The timing $t_c$ is synchronized with the timing circuit of OFF pulse oscillator 60 shown in FIG. 5. At this moment, namely, at the time $t=t_1$ designated in FIGS. 6A, 6B and 6C, if the auxiliary thyristor 32 is turned ON by means of the suitable means such as the timing means or the zero current detecting means, the electric charge accumulated in reverse to the polarity shown in FIG. 4 is discharged as the reverse current of the main thyristor 10, and therefore the large magnitude resonance current $I_{C2}$ flows into the main thyristor 10 through the auxiliary thyristor 32. Thereafter, the main thyristor 10 comes to the OFF state at the time $t=t_4$ designated in FIGS. 6B and 6C.

Figure 6B:
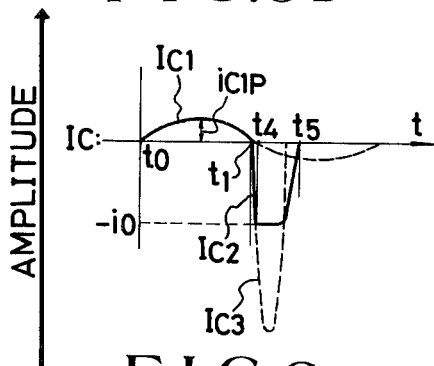
Figure 6C:
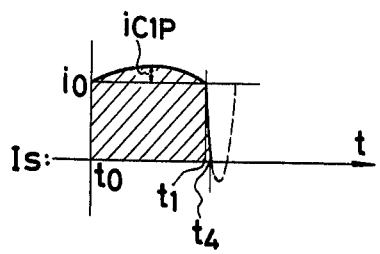
Figure 7:
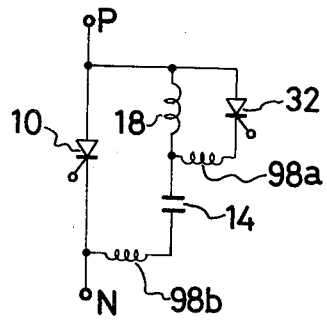
FIG. 7 is an equivalent circuit diagram of the circuit illustrating in FIG. 4.

The circuit of FIG. 7 is an equivalent chopper circuit relative to FIG. 4, and particularly the distributed inductance of the circuit is partially shown. In the circuit of FIG. 7, the distributed inductance 98a and 98b is connected hypothetically within a closed circuit which consists of the auxiliary thyristor 32, the capacitor 14 and the main thyristor 10. The distributed inductance 98a and 98b is of extremely small value relative to that of the reactor 18, and additionally act as the means for restricting the transient current ($di/dt$). A relatively small capacity reactor is, in some cases, purposely inserted into the circuit in order to restrict the $di/dt$. If the auxiliary thyristor 32 turns ON, the reactor 18 becomes short-circuited and resonance current $I_C$, designated in FIG. 6B, is generated owing to the capacitor 14 and the distributed inductance 98a and 98b whose inductance value is much lower than that of the reactor 18. Consequently, the reverse current begin to flow to the main thyristor 10. Although the resonance current $I_{C3}$ is, in reality, the steep and high peak value current as shown in FIG. 6B, the capacitor current $I_{C2}$ which flows in reverse with respect to the main thyristor 10, commutates towards the battery side of the time $t=t_4$ when the value $i_{c2}$ of the current $I_{C2}$ becomes $-i_0$. Thereafter the capacitor current $I_{C2}$ will become zero at the time $t=t_5$ as illustrated in FIG. 6B. Accordingly, the current $I_S = I_B + I_C$ will become zero at the time $t_4$ as is apparent from FIGS. 6A through 6C, and the main thyristor 10 come to the Off state. When the main thyristor 10 is in OFF state, the load current $I_B$ flowing through the main thyristor 10 continues to flow through the auxiliary thyristor 32 and the capacitor 14 during some time interval. Therefore the capacitor 14 is charged again to the polarity shown in FIG. 4. After some time interval, the main thyristor 10 is caused to assume the ON state by means of the ON-pulse from the ON-pulse oscillator 40 of the arrangement of FIG. 5, and an operation similar to the above-described is, in turn, repeated. Further, the average voltage to be supplied to the load can be controlled by means of changing the time duration from the beginning of the auxiliary thyristor's turning off to the time of commencing of the main thyristor's turning on. In the arrangement of FIG. 5, the above time duration can be varied by means of changing the potential at the tap of the variable resistor 54.

Figure 1:
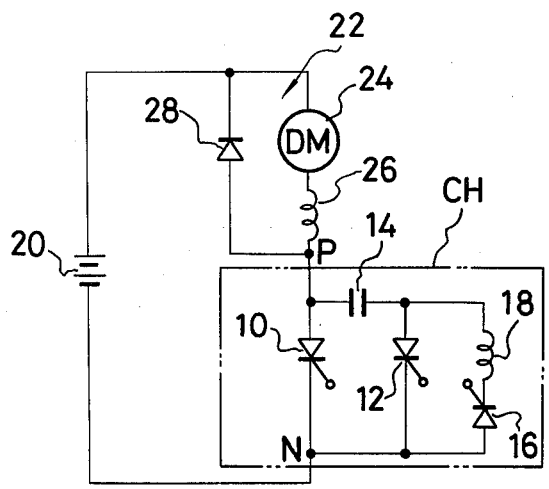
FIGS. 1 and 2, already referred above, are circuit diagrams of a chopper circuit of the prior art.
Figure 2:
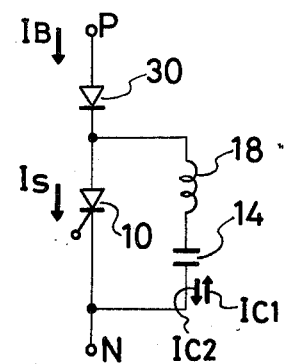
Figure 3:
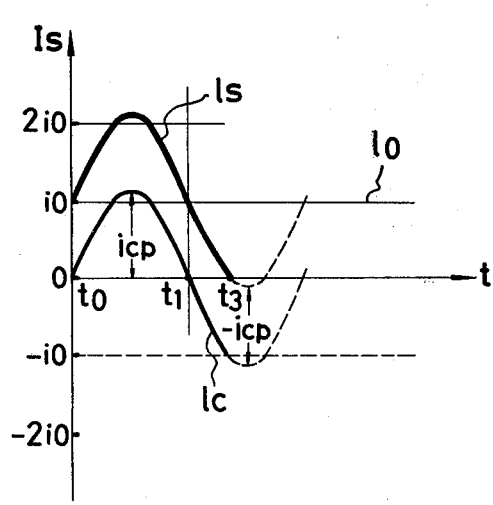
FIG. 3 is a curve depicting the oscillating current derived from the circuit of FIG. 2.

The capacitor current $I_C$ ($I_{C1}$ and $I_{C2}$) is asymmetrical as shown in the waveforms of FIG. 6B, and although the peak value $i_{c2p}$ of the reverse current $I_{C2}$ which is a partial portion of the current $I_{C3}$ is allowed to be of greater value, the peak value $i_{c1p}$ of the forward current $I_{C1}$, on the contrary, may be extremely small, because of the forward current $I_{C1}$ with respect to the main thyristor 10 flows through the reactor 18. Specifically, the reactance component is very small, because it is substituted for the distributed inductance components by the activation of the auxiliary thyristor 32. The peak value $i_{c3p}$ of the resonance current $I_{C3}$ designated in FIG. 6B becomes extremely large owing to the auxiliary thyristor 32. More specifically, in this case, the peak value $i_{c3p}$ of the reverse current is represented by a formulation $$i_{c3p} = \sqrt{\frac{Co}{Ld}} \times Vco ,$$

where Vco is the voltage of the capacitor 14 in the initiation of resonance, Co is the capacitance value of the capacitor 14 and Ld is the inductance value of the distributed indactance of the chopper circuit. As is apparent from the above formulation $$i_{c3p} = \sqrt{\frac{Co}{Ld}} \times Vco ,$$

when the capacitance value Co is constant and if, for example, Ld = 1/100 Lo (where Lo is the reactance value of the reactor 18), the peak value of the resonance current becomes ten times the peak value $i_{c1p}$ of the current $I_{C1}$. Consequently, according to the circuit of the present invention, the current to be treated will greatly increase in comparison with that of the prior art circuit shown in FIG. 2.

Figure 8:
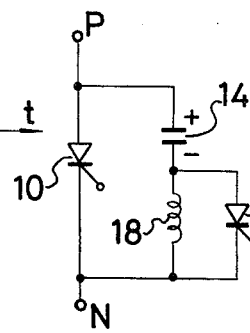
FIGS. 8 and 9 are, respectively, modifications of the circuit of FIG. 4.
Figure 9:
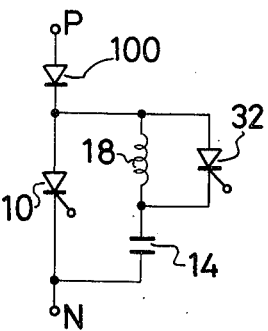

FIGS. 8 and 9 illustrate other modifications of the chopper circuit in FIG. 4. In the circuit of FIG. 8, one terminal of a reactor 18 connected in series with a capacitor 14 is connected to an anode electrode of a main thyristor 10, an anode electrode of an auxiliary thyristor 32 is connected to a juncture of the other terminal of the capacitor 14 and the reactor 18, and a juncture between a cathode electrode of the auxiliary thyristor 32 and the reactor 18 is connected to a cathode electrode of the main thyristor.

The circuit of FIG. 8 acts similar to the above described operation and has a similar effect. Since the cathode electrodes of the main thyristor 10 and the auxiliary thyristor 32 are respectively conductively coupled, a circuit for supplying the gating current to these thyristors is extremely simplified, because the pulse-transformer 81 (in FIG. 5) for electrically separating the cathode of the auxiliary thyristor 32 from the cathode of the main thyristor 10 is unnecessary.

In the circuit of FIG. 9, a diode 100 is connected serially and forwardly to the anode electrode side of the main thyristor 10, and the other elements of the circuit are arranged by similar to the circuit of FIG. 4. The advantage of this circuit is that, after the auxiliary thyristor 32 switches off, the ejection of the energy stored in the capacitor 14 and the reverse flow of the current are prevented together, and thereby the commutation operation is stabilized.

Additionally, although the circuits shown in FIGS. 4, 8 and 9 employ air-core coils, the invention is not limited to this, and a iron-core coils may also be employed.

Figure 10:
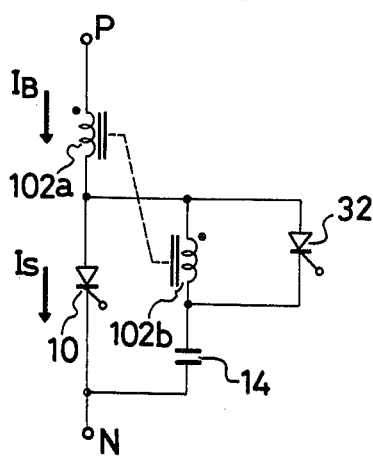
FIGS. 10 and 11 are, respectively, another embodiments of the chopper circuit according to the present invention.

FIG. 10 illustrates the chopper circuit of another embodiment in accordance with the present invention. The difference between the circuit of FIG. 10 and the circuit of FIG. 4 is that a primary winding 102a of a transformer is serially connected between the main thyristor 10 and the load, and a secondary winding 102b is connected in parallel with the auxiliary thyristor 32 substituting for the above mentioned reactor 18.

In operation, when the load current $I_R$ flows into the primary winding 102a, the induced voltage generates in the secondary winding 102b in response to the magnitude of the load current $I_R$, and as a result the induced voltage in the secondary winding 102b is added to the capacitor 14 as the commutation energy. Windings 102a and 102b are connected with the polarity as shown in the drawing.

Figure 11:
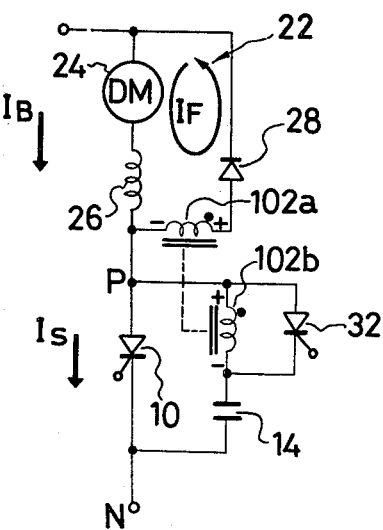

FIG. 11 designates further embodiment of a chopper circuit according to the present invention, the feature of the circuit shown in FIG. 11 is that a primary winding 102a of the transformer is connected, in the load circuit, between the field winding 26 and the free-wheeling diode 26, and a secondary winding 102b is connected in parallel with the auxiliary thyristor 32 in stead of the reactor 18, and further each windings 102a, 102b is connected with the polarity as shown in the drawings.

In the circuit of FIG. 11, after the main thyristor 10 becomes non-conductive and the auxiliary thyristor is also switched off, the current flowing through the motor 22 circulates via the primary winding 102a and the free-wheeling diode 28 due to the inductance, i.e., the armature winding 24 and the field winding 26. When the main thyristor 10 switches on, the circulating current $I_F$ which has flowed via the primary winding 102a and the free-wheeling diode 28 becomes zero, and, at this moment, the voltage is induced with the polarity as shown in the primary winding 102a. When the voltage is induced in the primary winding 102a, the induced voltage is generated in the secondary windings 102b with the polarity as shown. The induced voltage in the secondary winding 102b is added to the capacitor 14 as the commutation energy.

It is apparent from FIGS. 10 and 11 as discussed hereinabove that the variation of the current in the load circuit is detected by the primary windings of the transformer as the induced voltage of the secondary windings, and the induced voltage in the secondary windings causes the electric charge storing in the commutation capacitor to increase, and therefore the commutation capacity is enhanced.

An advantage over the prior art circuitry is that the new circuit is inexpensive because the number of switching elements is reduced and the capacitance value of the commutation capacitor is more suitable, and in this case although the inductance value of the inductance is desirably of high magnitude, the circuit is not expensive.

Another advantage of the present invention is that, as the value of the resonance current to be forwardly supplied from the capacitor to the main thyristor is small, the rated capacity of the thyristor can be small, and therefore the cost of the circuit is reduced in case of a given load current.

A further advantage is that, as the commutation capacity in increased in case of using a given capacitor and a given inductance, the circuit is capable of high performance and has good characteristic, and the current to be treated is greatly increased.

It is to be understood that the above-described circuits are only illustrative of the application of the principles of the present invention. In accordance with these principles, numerous other arrangements may be emphasized by those skilled in the art without departing from the spirit and scope of the invention.

What is claimed is:

1. A circuit arrangement comprising a load circuit arrangement, a first switching means connected to said load circuit arrangement, a resonating circuit which comprises a capacitance element and an inductance element, a second switching means connected to said inductance element, and means for aiding the commutation capacity of said capacitance element in response to the load current of said load circuit arrangement.

2. A circuit arrangement as defined in claim 1 wherein said first switching means is incorporated into said load circuit arrangement.

3. A circuit arrangement as defined in claim 1 wherein each of said first and second switching means comprises a thyristor.

4. A circuit arrangement as defined in claim 1 wherein said first switching means is serially connected to said load circuit arrangement, and said second switching means is connected to said inductance element in parallel and further unidirectionally with respect to said first switching means.

5. A circuit arrangement as defined in claim 1 wherein said capacitance element is connected between said first switching means and a juncture of said second switching means and said inductance element.

6. A circuit arrangement as defined in claim 1 comprising a transformer whose primary winding is connected in series with said load circuit, a main thyristor connected in series relationship to said primary winding of said transformer, a resonating circuit consisting of a capacitor and a secondary winding of said transformer and connected in parallel to said main thyristor, and an auxiliary thyristor connected in parallel relationship to said second winding.

7. A circuit arrangement as defined in claim 6 further comprising a diode connected in series with said primary winding of the transformer forwardly with respect to said main thyristor.

8. A circuit arrangement comprising a load circuit, a transformer whose primary winding is connected in series with said load circuit, a main thyristor connected in series relationship to said primary windings of said transformer, a resonating circuit consisting of a capacitor and a secondary winding of said transformer and connected in parallel to said main thyristor, and an auxiliary thyristor connected in parallel relationship to said secondary winding.

9. A circuit arrangement as defined in claim 8 said capacitor being connected between an anode electrode of said main thyristor and a juncture of said secondary winding and an anode electrode of said auxiliary thyristor which is connected unidirectionally with respect to said main thyristor.

10. A circuit arrangement as defined in claim 8 wherein said capacitor is connected between a cathode electrode of said main thyristor and a juncture of said secondary winding and a cathode electrode of said auxiliary thyristor which is connected in forward relationship with respect to said main thyristor.

* * * * *

UNITED STATES PATENT OFFICE
CERTIFICATE OF CORRECTION

Patent No. 3,968,420　　　　　　　　　Dated July 6, 1976

Inventor(s) Susumu Yoshida

It is certified that error appears in the above-identified patent and that said Letters Patent are hereby corrected as shown below:

After line 5, insert the following:

-- [30] Foreign Application Data
　　　October 9, 1973　　Japan ----------- 113442/73 --.

Signed and Sealed this

Twenty-second Day of February 1977

[SEAL]

Attest:

RUTH C. MASON
*Attesting Officer*

C. MARSHALL DANN
*Commissioner of Patents and Trademarks*